United States Patent
Powell et al.

(10) Patent No.: US 8,743,862 B2
(45) Date of Patent: Jun. 3, 2014

(54) HIGH SPEED OVERLAY MODE FOR BURST DATA AND REAL TIME STREAMING (AUDIO) APPLICATIONS

(75) Inventors: Clinton C Powell, Chandler, AZ (US); Kuor-Hsin Chang, Sunnyvale, CA (US); Bing Xu, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 55 days.

(21) Appl. No.: 13/175,453

(22) Filed: Jul. 1, 2011

(65) Prior Publication Data

US 2011/0261801 A1    Oct. 27, 2011

Related U.S. Application Data

(62) Division of application No. 11/935,156, filed on Nov. 5, 2007, now Pat. No. 7,983,235.

(51) Int. Cl.
| | |
|---|---|
| H04W 56/00 | (2009.01) |
| H04J 3/06 | (2006.01) |
| H04B 7/00 | (2006.01) |
| H04L 7/04 | (2006.01) |
| H04L 27/10 | (2006.01) |

(52) U.S. Cl.
USPC ........... 370/349; 370/350; 370/509; 375/146; 375/281; 375/362; 455/41.2; 455/42

(58) Field of Classification Search
USPC .......... 370/349, 350, 509; 375/146, 281, 362; 455/41.2, 42
See application file for complete search history.

(56) References Cited

U.S. PATENT DOCUMENTS

| | | | |
|---|---|---|---|
| 7,152,199 B2 | 12/2006 | Nuyen et al. | |
| 7,280,517 B2 | 10/2007 | Benveniste | |
| 7,295,619 B2 * | 11/2007 | Gersemsky et al. | 375/259 |
| 7,349,360 B2 | 3/2008 | Gutierrez et al. | |
| RE40,231 E * | 4/2008 | Snell et al. | 375/130 |
| 7,423,576 B2 | 9/2008 | Sahinoglu et al. | |
| 7,433,314 B2 | 10/2008 | Sharma et al. | |
| 7,440,764 B2 | 10/2008 | Retzer et al. | |
| 7,505,483 B2 | 3/2009 | Jeon et al. | |
| 7,577,122 B1 | 8/2009 | Schultz et al. | |
| 7,596,365 B2 | 9/2009 | Ferchland et al. | |
| 7,649,959 B2 * | 1/2010 | Tirkkonen et al. | 375/295 |
| 7,693,191 B2 * | 4/2010 | Gorday et al. | 370/515 |

(Continued)

FOREIGN PATENT DOCUMENTS

| | | |
|---|---|---|
| KR | 10-0631895 B1 | 10/2006 |
| WO | 0195579 A2 | 12/2001 |
| WO | 03050965 A1 | 6/2003 |

OTHER PUBLICATIONS

Radiopulse Inc., MG2400-F48 Datasheet, Ver.2.0, Jul. 20, 2007.
Schmid, GNU Radio 802.15.4 EN- and Decoding, NESL Technical Report TR-UCLA-NESL-200609-06, Sep. 2006.
International Search Report for PCT Application No. PCT/US2008/077373, mailed Apr. 15, 2009.

(Continued)

Primary Examiner — Alpus H Hsu

(57) ABSTRACT

In a wireless 802.15.4 communication system (300), a high-speed data frame structure (340) is provided which uses the 802.15.4 SHR structure that is spread modulated to obtain the synchronization benefits of the 802.15.4 protocol, but which uses a modified data frame structure for the payload portion without using spreading to thereby improve its transmission efficiency. The transmission efficiency can be further increased by increasing the size of the data payload (and correspondingly, the frame length size).

14 Claims, 6 Drawing Sheets

(56) References Cited

U.S. PATENT DOCUMENTS

| | | |
|---|---|---|
| 7,792,091 B2 | 9/2010 | Sahioglu et al. |
| 7,801,107 B2 | 9/2010 | Sahinoglu et al. |
| 7,869,409 B2 * | 1/2011 | Ivonnet et al. ............... 370/335 |
| 2002/0151289 A1 | 10/2002 | Rahman et al. |
| 2004/0013083 A1 | 1/2004 | Sobchak et al. |
| 2006/0094477 A1 | 5/2006 | Rivert-Cintron et al. |
| 2006/0186973 A1 | 8/2006 | Satou |
| 2007/0047682 A1 | 3/2007 | Haentzschel et al. |
| 2007/0063834 A1 | 3/2007 | Bozzone et al. |
| 2007/0086532 A1 | 4/2007 | Ferchland et al. |
| 2007/0091813 A1 | 4/2007 | Richard et al. |
| 2007/0104297 A1 | 5/2007 | Gorday |
| 2007/0140163 A1 * | 6/2007 | Meier et al. ................... 370/329 |
| 2007/0207750 A1 | 9/2007 | Brown et al. |
| 2008/0188181 A1 | 8/2008 | Choi et al. |

OTHER PUBLICATIONS

Supplementary European Search Report for EP Application No. 08847791.4 dated Jul. 19, 2012.

Ryuhei Funada et al., A design of single carrier based PY for IEEE 802.15.3c standard, IEEE International Symposium on Personal, Indoor, and Mobile Radio Communications, PIMRC, Sep. 1, 2007, pp. 1-5.

A. Li et al., A Cross-Layer Design on the Basis of Multiple Packet Reception in Asynchronous Wireless Network, Proceedings of the 2007 IEEE International Conference on Communications (ICC 2007), Jun. 24-28, 2007, Glasgow UK, IEEE, Piscataway NJ, Jun. 1, 2007, pp. 3477-3484.

L. Carrier et al., An Overview of the Space Shuttle Orbiter Communication and Tracking System, IEEE Transactions on Communications, IEEE Service Center, Piscataway NJ, vol. 26, No. 11, Nov. 1, 1978, pp. 1494-1506.

\* cited by examiner

HIGH SPEED OVERLAY MODE FOR BURST DATA AND REAL TIME STREAMING (AUDIO) APPLICATIONS

CROSS-REFERENCE TO RELATED APPLICATIONS

This application is a divisional of application Ser. No. 11/935,156, filed Nov. 5, 2007 and issuing as U.S. Pat. No. 7,983,235 on Jul. 19, 2011, which is incorporated herein by reference in its entirety.

BACKGROUND OF THE INVENTION

1. Field of the Invention

The present invention is directed in general to wireless communication systems. In one aspect, the present invention relates to a method and system for transferring data over a limited rate wireless communication protocol.

2. Description of the Related Art

Wireless communication devices used to form a wireless personal area network (WPAN) often have limited power sources and signaling infrastructure. These design limitations present significant challenges in terms of data transfer capabilities and power consumption during operation for extended periods of time. Consequently, various protocols have been developed to implement WPANs using small, power-efficient, inexpensive communication devices. For example, IEEE Standard 802.15.4 is a standard which specifies the physical layer and medium access control for low-data-rate, low-power wireless personal area networks in which very low cost wireless communications to nearby devices are provided with little to no underlying infrastructure and limited power consumption. While the 802.15.4 standard provides an excellent wireless transport mechanism for low rate data, control, monitoring and non real time audio applications, the data rate is not sufficient to support burst data and real time audio. In particular, the 802.15.4 standard currently provides for instantaneous, over-the-air data rate of up to 250 kbps, resulting in an effective data rate slightly greater than 100 kbps for point-to-point connections. This effective data rate decreases rapidly as multiple nodes are added to an 802.15.4 based network, such as that specified by the ZigBee Standard. While the 802.15.4 standard does provide for multiple channels, the simultaneous use of these channels would require employing multiple transceivers to increase the effective data rate and would therefore be cost prohibitive. Accordingly, there is a need for an improved system and methodology for efficiently transferring data in connection with a wireless communication system and protocol which overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
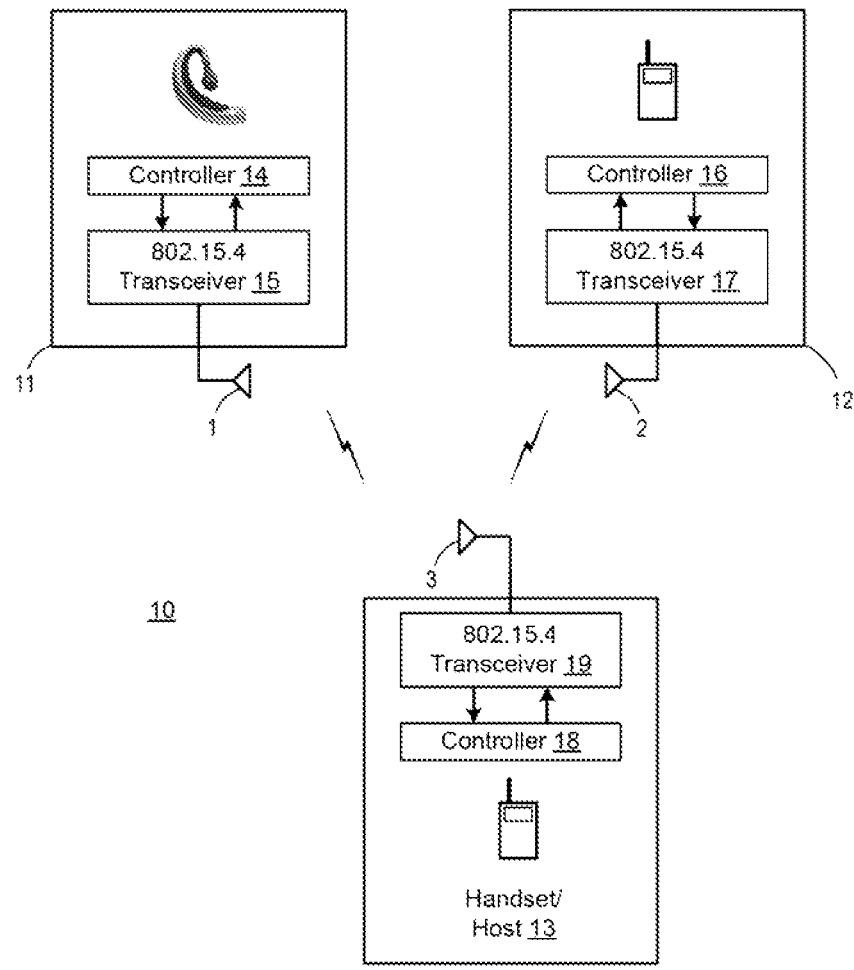
FIG. 1 is a schematic block diagram of an example wireless communication system in which selected embodiments of the present invention may be implemented.

A wireless communication system and methodology are described for defining a high-speed overlay mode for transmitting data at a higher rate (e.g., up to about 2 Mbits/sec) in a wireless personal area network, such as an 802.15.4 network, by selectively applying spreading code modulation to only part of a data frame packet so that spreading code modulation is not applied to the data portion of the data frame, thereby increasing the data throughput. Spreading is normally applied to the entire data packet as part of the 802.15.4 transmission modulation, and while spreading provides additional robustness during packet acquisition, it also reduces the effective data throughput when applied to the data portion of the packet. Accordingly, selected embodiments of the present invention have increased the data throughput by disabling spreading for at least the data portion of the data frame packet in the high-speed overlay mode. Indeed, the increased data throughput in the high-speed overlay mode enables burst data and real time streaming (audio) applications. By spreading only the synchronization header structure of the 802.15.4 data frame and including a signal in the synchronization header structure to signify a high-speed data transfer mode whereby the remainder of the data frame is not spread, a high-speed overlay mode is enabled to provide a higher data throughput with minimal hardware changes to the 802.15.4 devices, while re-using the synchronization header portion of the 802.15.4 data frame to thereby maintain the initial synchronization benefits of the 802.15.4 protocol and share the time synchronization circuit of the normal 802.15.4 devices. To this end, a high-speed data frame structure is proposed which uses the 802.15.4 preamble structure, but has a larger data payload portion (and therefore frame length portion), resulting in a larger packet length. In selected embodiments, the high-speed overlay mode is signaled by including a unique value in the Start-of-Frame Delimiter (SFD) field portion of the 802.15.4 data frame. For example, when the high-speed overlay mode data packet includes an SFD value (e.g., C5) having has a large hamming distance from the SFD value (A7) that is used in a standard 802.15.4 data packet, the high-speed overlay mode data packet may be readily differentiated from the standard 802.15.4 data packet. With this approach, interference to other standard 802.15.4 devices is reduced with minimal impact on battery life to the 802.15.4 network.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

FIG. 1 illustrates a schematic block diagram of an example wireless communication system 10 in which selected embodiments of the present invention may be implemented. As illustrated, the wireless communication system 10 includes a plurality of transmitting/receiving devices 11-13 in the form of stationary or mobile devices that wirelessly exchange information by means of radio signals. The transmitting/receiving devices 11-13 may be portable or cellular phones or handsets, wireless headsets, wireless physiological sensors, wireless computer peripherals, wireless home automation and the like, and may communicate with one another using a predetermined wireless communication protocol, such as the 802.15.4 protocol. When implemented as a WPAN, one of the transmitting/receiving devices (e.g., cellular handset 13) may be a full-function device that provides the function of the WPAN coordinator, while the other transmitting/receiving devices (e.g., 11, 12) may be limited function devices, which are associated with the full-function device and can exchange data only with it. When configured as a star-shaped network, it will be appreciated that bidirectional data transmission can occur only between one of the limited function devices at a time and the full-function device, but not between the limited function devices. However, in a peer-to-peer network configuration, the 802.15.4 standard allows every full-function device to communicate with every other full-function device.

Each of the transmitting/receiving devices 11-13 has an associated antenna or antenna array 1-3, respectively, to communicate with the wireless communication devices in its area. In addition, each transmitting/receiving device 11-13 includes an 802.15.4 transceiver unit 15, 17, 19 (respectively) associated with the antenna, and a controller unit 14, 16, 18 (respectively) associated with the transceiver unit for controlling the transmission and reception of data over the antennas. While not shown, each transmitting/receiving device 11-13 may also include a power supply unit (e.g., a battery) and additional components, such as sensors, actuators, etc. When operating in an 802.15.4 network, each transceiver unit 15, 17, 19 senses the functionalities specified at the level of the physical layer (PHY) of the 802.15.4 communication standard, whereas the controller unit 14, 16, 18 assumes those of the media access control (MAC) layer and optionally higher layers. As will be appreciated, the PHY layer functionalities include, for example, the transmitting and receiving of PHY data frames (PPDU) over the physical channel (modulation/demodulation, synchronization, etc.). On the other hand, the MAC layer provides addressing and channel access control mechanisms that make it possible for several terminals or network nodes to communicate within a multipoint network, such as the acknowledgment of successfully received PHY data frames by acknowledgement frames (ACK), the further procedure in abortive transmission attempts, or anti-collision methods such as CSMA-CA (carrier sense multiple access with collision avoidance).

Figure 2:
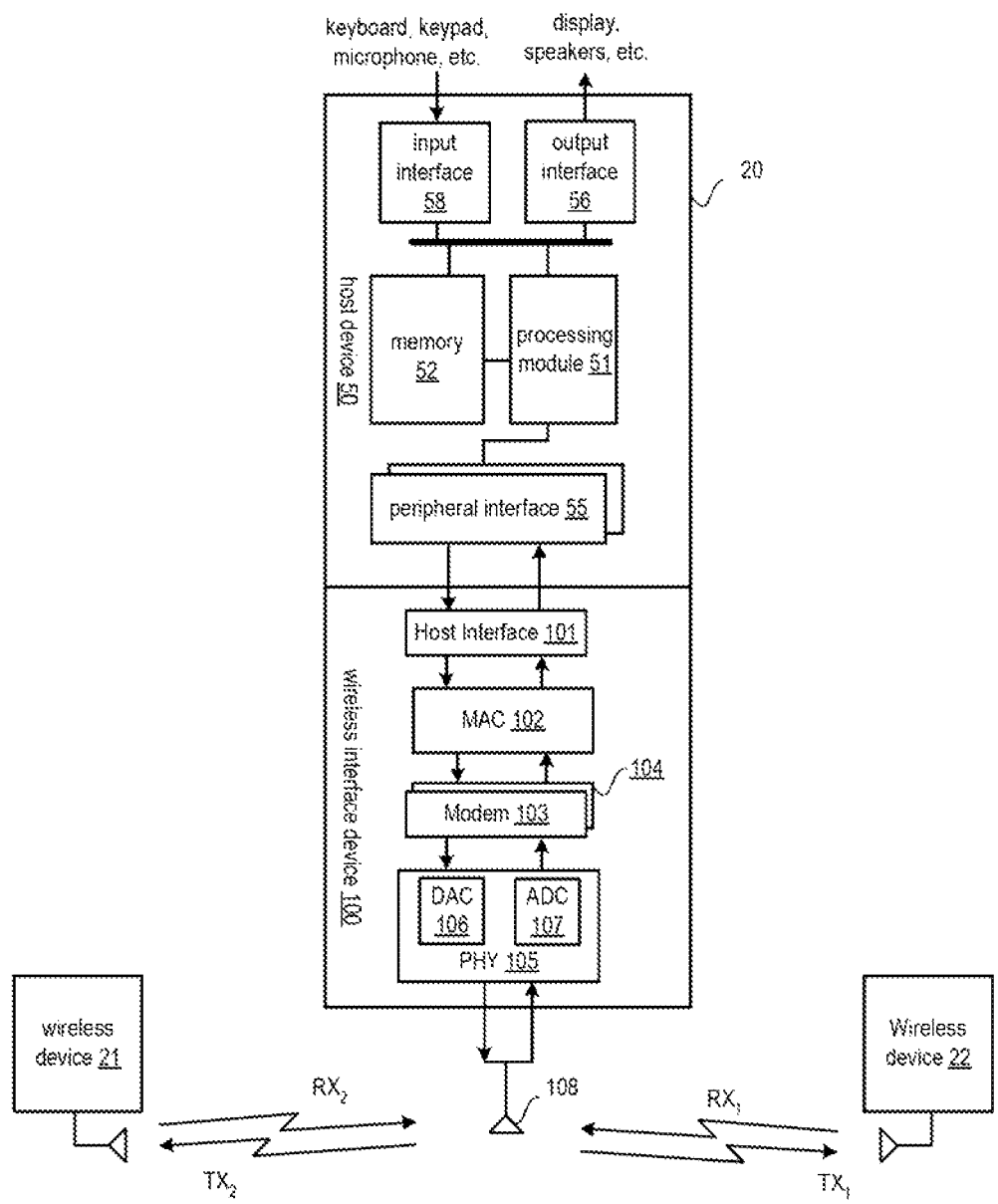
FIG. 2 is a schematic block diagram of a wireless 802.15.4 communication device in accordance with selected embodiments of the present invention.

FIG. 2 is a schematic block diagram illustrating a wireless communication device 20 that may be used as full-function device in an 802.15.4 network of wireless devices 21, 22. As depicted, the wireless communication device 20 includes the host device or module 50 and at least one wireless interface device 100 which may be integrated with or constructed separately from the components of the host device 50. The host device 50 is shown as including a processing module 51, memory 52, peripheral interface 55, input interface 58 and output interface 56, but it will be appreciated that other components and configurations may be used, including but not limited to integrating a high-performance embedded microcontroller with associated program and data memory. However configured, the processing module 51 and memory 52 cooperate to provide the specified host functionality, such as a cell phone function, in which case the processing module 51 performs the corresponding communication functions in accordance with a particular cellular telephone standard. For data received from the wireless interface device 100 (e.g., inbound data), the peripheral interface 55 provides the data to the processing module 51 for further processing and/or routing to the output interface 56. The output interface 56 provides connectivity to an output display device such as a display, monitor, speakers, etc., such that the received data may be displayed. In the other direction, the processing module 51 may receive the outbound data from an input device such as a keyboard, keypad, microphone, etc. via the input interface 58 or generate the data itself. For data received via the input interface 58, the processing module 51 may perform a corresponding host function on the data and/or route it to a wireless interface device 100 via the peripheral interface 55 which provides the data to the wireless interface device 100.

As for the wireless interface device 100, there is provided a host interface 101, a media access control protocol (MAC) layer module 102, separately selectable modem modules 103, 104, a physical layer module (PHY) 105, a digital-to-analog converter (DAC) 106, and an analog-to-digital converter (ADC) 107. Typically, transmit data coming from the host device 50 is presented to the MAC module 102 which, in selected embodiments, provides 802.15.4 compliant hardware support, such as control of packet transmission/reception, security-related encryption, error detection and control, and the like. The MAC module 102 presents the transmit data to the baseband modems 103, 104 which modulate the data depending on the selected transmit mode. As described more fully below, if the standard 802.15.4 transmission mode is selected, then the baseband modem 103 processes the MAC data by performing spreading and pulse-shaping on the entire data packet, but if a high-speed transmission mode is selected, then the baseband modem 104 passes the high-speed data (spread SHR and unspread PHR/MPDU) from the MAC module 102 to the PHY module 105. The data from the selected baseband modem 103, 104 is presented to the PHY module 105 which processes the transmit data (encoding, modulation, etc.) and then hands its output to the DAC 106 for conversion to an analog signal if it has not been converted to the analog signal during the modulation process. The modulated analog signal or DAC output may then be gained and filtered and passed to the antenna section 108. On the receive side, the antenna section 108 output is passed to the PHY module 105 where it is gained, filtered and digitized into a digital signal by the ADC 107. The digital signal may be further processed by the PHY module 105 into digital representation and passed to the baseband modems 103, 104 which demodulate the bits depending on which transmission mode was used to send the received data. If the standard 802.15.4 transmission mode was used, then the baseband modem 103 performs despreading on the bits for the entire data packet, but if a high-speed transmission mode was used, then the baseband modem 104 processes the MAC data by performing despreading on only the synchronization header portion of the data packet, and then separately demodulating the remaining packet bits, such as by performing an OQPSK or FM demodulation. The demodulated data is passed through the MAC module 102 to the host 50 for delivery to the output interface 56. As will be appreciated, one or more of the modules in the wireless interface device 100 may be implemented with dedicated hardware, alone or in combination with a communications processor and an associated memory for storing and executing instructions that control the access to the physical transmission medium in the wireless network.

Figure 3:
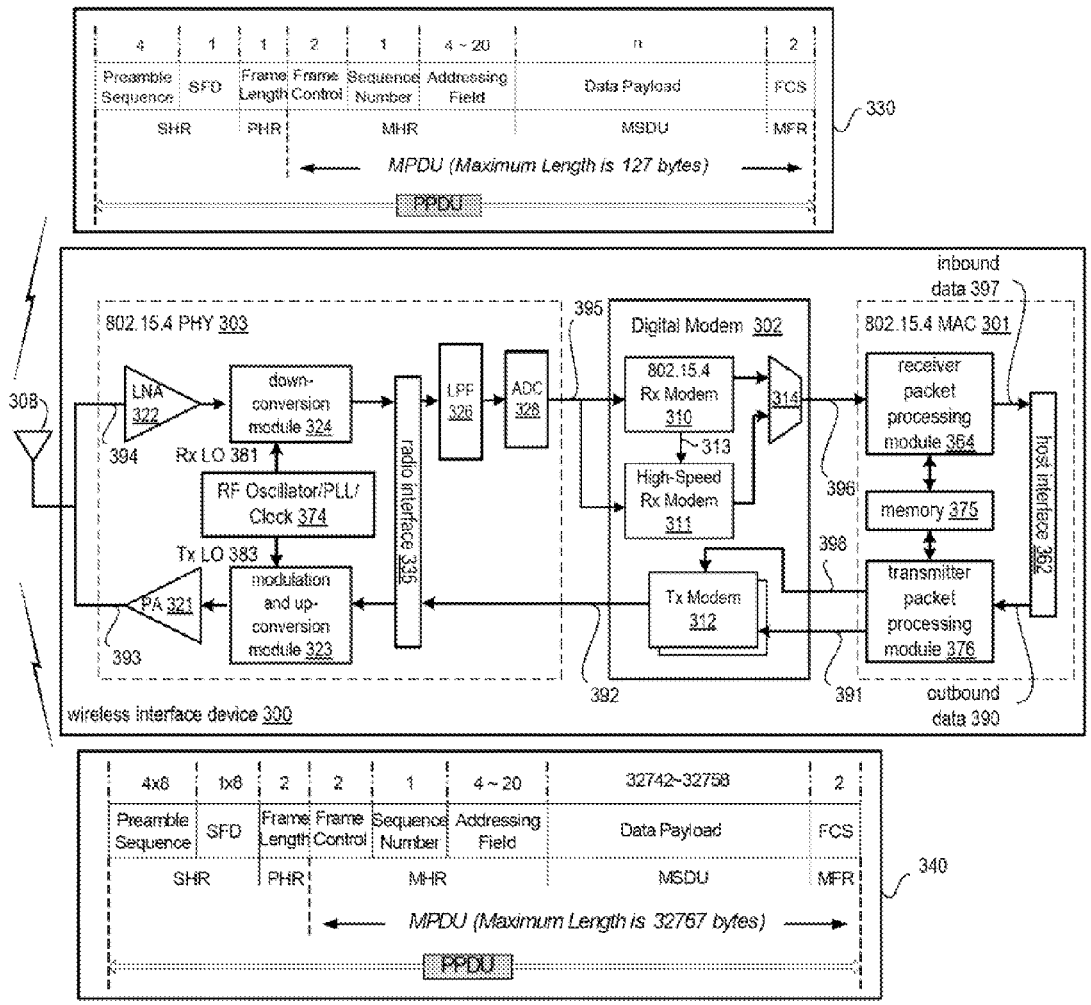
FIG. 3 is a schematic block diagram of a wireless 802.15.4 interface device in accordance with selected embodiments of the present invention.

FIG. 3 is a schematic block diagram illustrating a wireless interface device 300 that may be used in an 802.15.4 network of wireless devices to send or receive data. As depicted, the wireless communication device 300 receives and processes signal information received on the antenna section 308 with a low noise amplifier (LNA) 322, a down-conversion stage 324, a filtering/gain module 326, an analog-to-digital converter (ADC) 328, a baseband modem section 302, a receiver packet processing module 364 and an optional host interface 362. For data transmission, the wireless communication device 300 includes a transmitter packet processing module 376, the baseband modem section 302, a modulation and mixing up-conversion stage 323, a power amplifier (PA) 321 and an antenna section 308 of one or more antennas. Of course, additional components may be included in the wireless interface device The receiver picket processing module 364, transmitter packet processing module 376 and the memory 375 together form the MAC module 301 which, together with the digital modem 302, executes and/or controls the digital receiver functions and digital transmitter functions in accordance with a particular wireless communication standard, such as the 802.15.4 standard. The receiver packet functions include, but are not limited to, receive packet processing, demodulation, despreading, decoding, descrambling and/or error detection. The digital transmitter functions include, but are not limited to, CRC coding, scrambling, encoding, spreading, modulation and/or transmit packet processing. As will be appreciated, the receiver packet and transmitter packet processing modules 364, 376 may be implemented using dedicated MAC accelerator hardware or control logic, a shared processing device, individual processing devices, and/or a plurality of processing devices, where a processing device may be a microprocessor, micro-controller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory 375 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 364, 376 implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In transmit operation, the wireless interface device 300 receives outbound data 390 from the host device via the host interface 362. The host interface 362 routes the outbound data 390 to the transmitter packet processing module 376, which processes the outbound data 390 to produce digital packet data 391 in accordance with a particular wireless communication standard, such as IEEE 802.15.4 (including all current and future subsections). The digital packet data 391 is then sent to the digital modem 302 where it is processed into a digital transmission formatted data 392 by one of the transmit modems 312 depending on what transmission mode is selected, all as explained more fully below. Subsequent stages convert the digital transmission formatted data 392 to an RF signal using a PHY module 303. In an example embodiment in which a signal is transmitted in accordance with a first signaling protocol (e.g., IEEE 802.15.4), the PHY module 303 includes a modulation and up-conversion module 323 which converts the digital transmission formatted data 392 from the digital domain to the analog domain, filters and/or adjusts the gain of the analog signal, and up-converts the filtered/adjusted analog signal with a mixing stage to directly convert the analog baseband or low IF signal into an RF signal based on a transmitter local oscillation clock 383 provided by local oscillation/PLL/clock module 374. The power amplifier 321 amplifies the RF signal to produce outbound RF signal 393 which is applied to the antenna section 308 through a transmit/receive antenna switch (not shown).

As for receive operations, an inbound RF signal 394 from another wireless communication device is received by the wireless interface device 300 at the antenna section 308 and transmitted via an antenna switch (not shown) to the PHY module 303. The inbound RF signal is converted into digital reception formatted data, either directly or through an intermediate frequency conversion process which may be implemented as follows. The inbound RF signal 394 is amplified by the low noise amplifier 322. At the down conversion module 324, the amplified inbound RF signal is combined or mixed with a receiver local oscillation clock 381 provided by local oscillation module 374, thereby directly converting the amplified inbound RF signal into an inbound low IF signal or baseband signal. The down conversion module 324 provides the inbound low IF signal or baseband signal to the lowpass filter/gain module 326 via the radio interface 335. The filtering/gain module 326 lowpass filters and/or gains the inbound low IF signal or the inbound baseband signal to produce a filtered inbound signal. The analog-to-digital converter 328 converts the filtered inbound signal from the analog domain to the digital domain to produce digital reception formatted data 395. The digital reception formatted data 395 is then sent to the digital modem 302 where it is processed into a digital base-band signal 396 by one of the receive modems 310, 311, depending on what transmission mode is selected, all as described more fully below. The receiver packet processing module 364 takes the despread digital reception formatted data 396 and then decodes and descrambles it to recapture inbound data 397 in accordance with the particular wireless communication standard being implemented by wireless interface device. The host interface 362 provides the recaptured inbound data 397 to the host device.

As illustrated in FIG. 3, the normal 802.15.4 operation uses a PHY protocol data unit (PPDU) packet structure 330 that has been defined for the transmission and reception across the physical radio channel. The defined 802.15.4 data frame structure 330 may be described with reference to its constituent structures and their corresponding units of length, which are indicated in the top row with each unit of length being an octet (byte). First of all, the data frame 330 starts with synchronization header (SHR) and packet header (PHR) which together comprise six octets. As will be understood, the SHR includes a predefined preamble sequence portion (4 octets) and a start-of-frame delimiter (SFD) portion (1 octet), and is used for initial synchronization between transmitter and receiver. In the PHR (1 octet), seven bits of the octet are use to specify the frame length information. After the SHR and PHR, a variable length payload (up to 127 bytes) is provided which carries the MAC protocol data unit (MPDU), which includes a MAC header (MHR) for specifying the frame control, sequence number and addressing fields, a MAC service data unit (MSDU) for the data payload, and MAC footer (MFR) for providing the frame check sequence value.

Figure 4:
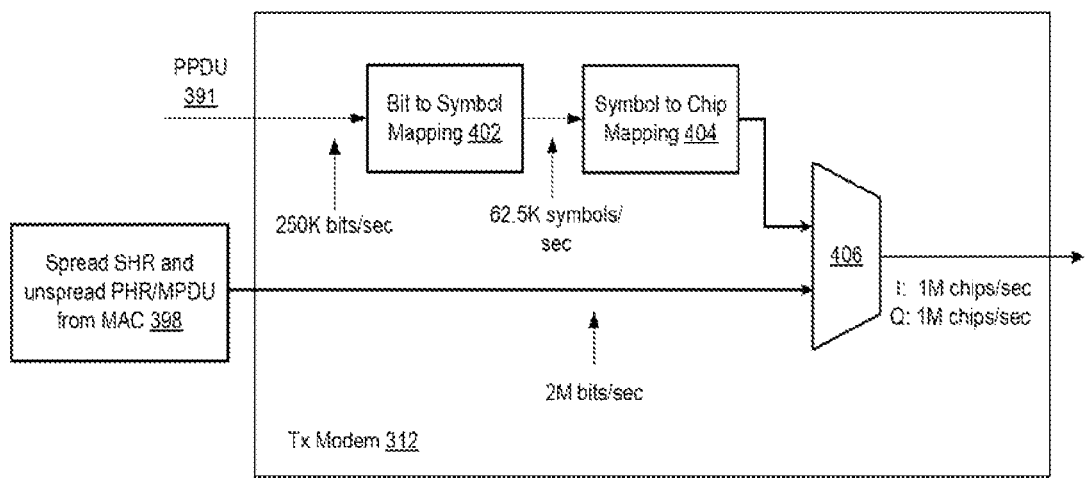
FIG. 4 is a schematic block diagram of a transmission modem module in accordance with selected embodiments of the present invention.

Under the 802.15.4 protocol, the bits of the data frame 330 are modulated for transmission by grouping every four data bits in the data frame 330 into one symbol, mapping each 4-bit symbol into a 32-chip PN sequence, and sending the chip level data sequence to an offset quadrature phase-shift keying (O-QPSK) modulator. Part of these modulation operations are performed in the transmit modem 312 which, as shown by the block diagram schematic in FIG. 4, may include a bit-to-symbol mapping unit 402 for receiving the PPDU frame, a symbol-to-chip mapping unit 404. The output of transmit modem 312 goes to module 323 for O-QPSK modulation. The result of these operations is to effectively implement a direct sequence spread spectrum (DSSS) system with a spreading factor of 8 which provides a processing gain of 9 dB ($10 \times \log_{10}(8)$). This 1 to 8 spreading is used is to increase the receiver sensitivity hence, and thereby increase the transmission range. As illustrated in FIG. 4, the data rate in an 802.15.4 device operating at 2.4 GHz before spreading is 250 kbps, and after the spreading, the chip rate is 2 Mcps. However, even though the transmission chip rate is 2 Mcps, the effective data rate for typical 802.15.4 communications is about 100 kbps. The lower effective data rate is caused by the fact that data frame overhead is being transmitted, and also by the additional signaling overhead that is used during the communication process, such as transmitting and receiving acknowledgement (ACK) frame. For applications that were originally targeted by the 802.15.4 protocol (such as home automation and remote meter reading), a data rate of 100 kbps is sufficient. However, there are other short-distance applications that require higher data rates, including but not limited to burst data communication applications, such as image data transfer applications, medical data transfer, or real-time audio communication between wireless headset (such as Bluetooth headset) and cellular handset.

Accordingly, a high-speed data frame structure 340 is proposed which increases the transmission throughput by relaxing the receiver sensitivity for the data payload portion, while maintaining the synchronization benefits provided by the 802.15.4 protocol. In particular, the proposed high-speed data frame structure 340 includes the same synchronization header (SHR) structure as is used in the 802.15.4 data frame structure 330 so that the existing 802.15.4 platform structure can be used to transmit and receive the SHR structure. However, the proposed high-speed data frame structure 340 includes a data payload portion that is used to convey data at a higher rate than the standard 802.15.4 operation by foregoing the spreading operation on the MPDU data payload while preserving the O-QPSK modulation.

By using the existing SHR structure of 802.15.4 standard, the proposed high-speed data frame structure 340 allows the existing 802.15.4 platform structure to be used to maintain the existing 802.15.4 synchronization benefits. This is important for nominal wireless communications, and especially for packet by packet communications, since successful initial synchronization is an important part of the communication process. By using the existing SHR structure of 802.15.4 standard, a robust initial synchronization can be obtained by sharing the existing 802.15.4 time synchronization circuit.

Once initial synchronization is established, the rest of signal processing to recover the transmitted signal becomes easier so that it is not necessary that the rest of the data frame 340 (after the SHR) be spread. When only the SHR is spread, the overall throughput is close to the chip rate. The proposed high-speed data frame structure 340 exploits this fact by processing the MPDU data payload structure without spreading using a modified digital modem, thereby providing a higher data rate that can be used for both low and high data rate communications with minimal add-on cost. To this end, the MHR (MAC header) and MFR (MAC footer) in the high-speed data frame structure 340 are the same as the typical 802.15.4 frame structure, though the MHR and MFR structures in the high-speed data frame structure 340 are not spread during transmission modulation. While the standard 802.15.4 MSDU (data payload) structure may also be used in the high-speed data frame structure 340, its maximum length (127 bytes) limits the transmission efficiency if used for an un-spread data packet. Accordingly, the transmission efficiency may be improved by increasing the maximum length of the MPDU in the high-speed data frame structure 340. In accordance with selected embodiments, the maximum length of the MPDU in the high-speed data frame structure 340 is increased to 32,767 bytes, meaning that the frame length field (PHR) is increased to two bytes for high-speed mode. For this high-speed mode, the raw data rate is increased from 250 kbps to 2 Mbps.

The actual data throughput for the high-speed mode is largely determined by packet length. Ideally, the longest possible packet length is desired to maximize throughput with limited overhead. However, a longer packet length means the packet is more susceptible to timing error, frequency error, and co-channel interference. Simulation results show that, with data payloads of 400 bytes or less, the effect of timing error and frequency error is reduced or benign. For a packet length of 400 bytes, the effective data rate is greater than 780 kbps, assuming that the backoff exponential for CSMA-CA algorithm is 2 and that back off is required 50% of time. This enhanced data rate opens several applications which are difficult for standard 802.15.4/ZigBee devices to support. For example, to be used as a cell phone wireless headset link to support full duplex communications, the required effective data rate is 128 kbps. While standard 802.15.4/ZigBee devices can not support this data rate, the high-speed overlay mode described herein can easily support such data rates, and can even provide throughput rates many times faster. Other applications for the high-speed overlay mode include wireless audio communications, such as 2-way mono voice (which may be used with real time cellular wireless headset applications) and 1-way stereo (which may be used with real time CD quality wireless stereo transmission). In addition, the high-speed overlay mode may be used for wireless burst data transfer applications (e.g., non-real time transfer of large files in applications such as imaging and medical applications) and other high speed (relative to ZigBee) data communications.

To illustrate how the high-speed data frame 340 is selectively modulated by the transmit modem for transmission by the wireless interface device 300, reference is made to the transmit modem 312 depicted in FIG. 3 and its schematic level details shown in FIG. 4. As shown in FIGS. 3 and 4, a typical 802.15.4 PPDU frame structure 330 that is presented as digital data packet 391 to the transmit modem 312 would be spread modulated using the mapping units 402, 404 prior to O-QPSK modulation. In contrast, a high-speed data frame 340 may effectively bypass the spreading modulation by having the MAC module 301 directly present the data bits 398 for the high-speed data frame to the MUX 406 that is connected to the O-QPSK modulation unit 323. While the selective routing of data bits 398 may be implemented in a variety of different ways, in selected embodiments, a selection switch or multiplex circuit 406 is used to selectively connect the data bits 398 for the high-speed data frame and the output from the mapping units 402, 404 to the O-QPSK modulation unit 323. With this arrangement, the SHR for the high-speed data frame 340 may be stored in spread form in the MAC memory, and presented directly to the multiplexer 406 at a rate of 2M bits/sec. In addition, the remainder of the high-speed data frame 340—including the PHR and MPDU structures—may be presented in unspread form directly to the multiplexer 406 at a rate of 2M bits/sec. As will be appreciated, the data payload and error correction portions of the high-speed data frame 340 may be generated by the MAC module 301 or by the host CPU.

In the embodiments described herein where the data payload of the high-speed data frame 340 is not spread with the PN code, the transmitted data no longer has white-noise properties. This can result in undesirable DC bias effects. In selected embodiments, the transmitted data may be processed so that it appears to have white-noise properties by using an m-sequence to scramble the data payload before it is appended to the SHR to form a data packet. To make sure that the re-transmitted data packet is uncorrelated with the original transmitted data packet, two different m-sequences are used for scrambling. These two m-sequences are used alternately for the first transmitted data packet and for the subsequently re-transmitted data packet. At the receiver, two different de-scramblers are used to de-scramble the received data payload. Which scrambling sequence is used for a particular data packet is set in the MSB bit of the frame length field.

To illustrate how the standard 802.15.4 data frame 330 and high-speed data frame 340 are received, reference is made to the wireless interface device 300 depicted in FIG. 3. Since the preamble is the same for the high-speed data frame 340 and the 802.15.4 data frame 330, the same preamble detection circuitry in the wireless interface device 300 is used for both modes of operation. For example, the 802.15.4 receiver modem 310 may be used to detect the preamble sequence by demodulating the digital reception formatted data 395 with a despreading process. Once the preamble sequence is detected and initial time synchronization is established, the remainder of the data frame can either go to the 802.15.4 receiver modem 310 or the high-speed receive modem 311, depending on whether a standard 802.15.4 data frame 330 or a high-speed data frame 340 has been received. If a standard 802.15.4 data frame 330 is received, the 802.15.4 receiver modem 310 demodulates the remainder of the 802.15.4 data frame, again by applying a despreading process. On the other hand, if a high-speed data frame 340 is received, the high-speed receiver modem 311 uses a non-despreading demodulation process to demodulate the remainder of the 802.15.4 data frame.

The use of separate receiver modems 310, 311 to selectively demodulate the 802.15.4 data frame may be controlled in a variety of different ways. For example, each data frame packet may be input to both receiver modems 310, 311 so that the respective outputs are selected by the multiplexer 314. In addition or in the alternative, the 802.15.4 receiver modem 310 may include detection circuitry or control logic which detects high-speed data frame structures and issues a detection signal 313 instructing the high-speed receiver modem 311 to take over demodulation of the detected high-speed data frame structure.

While the high-speed data frame 340 may be detected using any desired technique, an example implementation uses an SFD detection circuit or module in the 802.15.4 receiver modem 310 which exploits the fact that a predetermined SFD value is used in the standard 802.15.4 protocol. In particular, the 802.15.4 protocol uses the value of A7 as the SFD. To differentiate the high-speed data frame, a different SFD value may be used to signal the high-speed mode. For example, in a selected embodiment, the value C5 is the SFD for the high-speed data frame 340. In this way, the digital reception formatted data 395 representing a received data packet is routed to either the 802.15.4 modem 310 or the high-speed modem 311 for further processing, depending on the SFD value that is detected. By using a different SFD value for the high-speed mode, mixed modes of operation are possible. In addition, packet reception performance is improved by using different SFD values (which are in the front of the data packet) since regular 802.15.4 nodes can reject high speed packets at the front of the packet (i.e., when the SFD is detected), as opposed using an end-of-packet detection scheme (i.e., CRC calculation) to detect high-speed packets. In addition to expediting the detection/rejection decision, SFD-based detection also preserves energy and reduces battery usage for regular 802.15.4 nodes that are not intended to receive the high speed packets.

Figure 5:
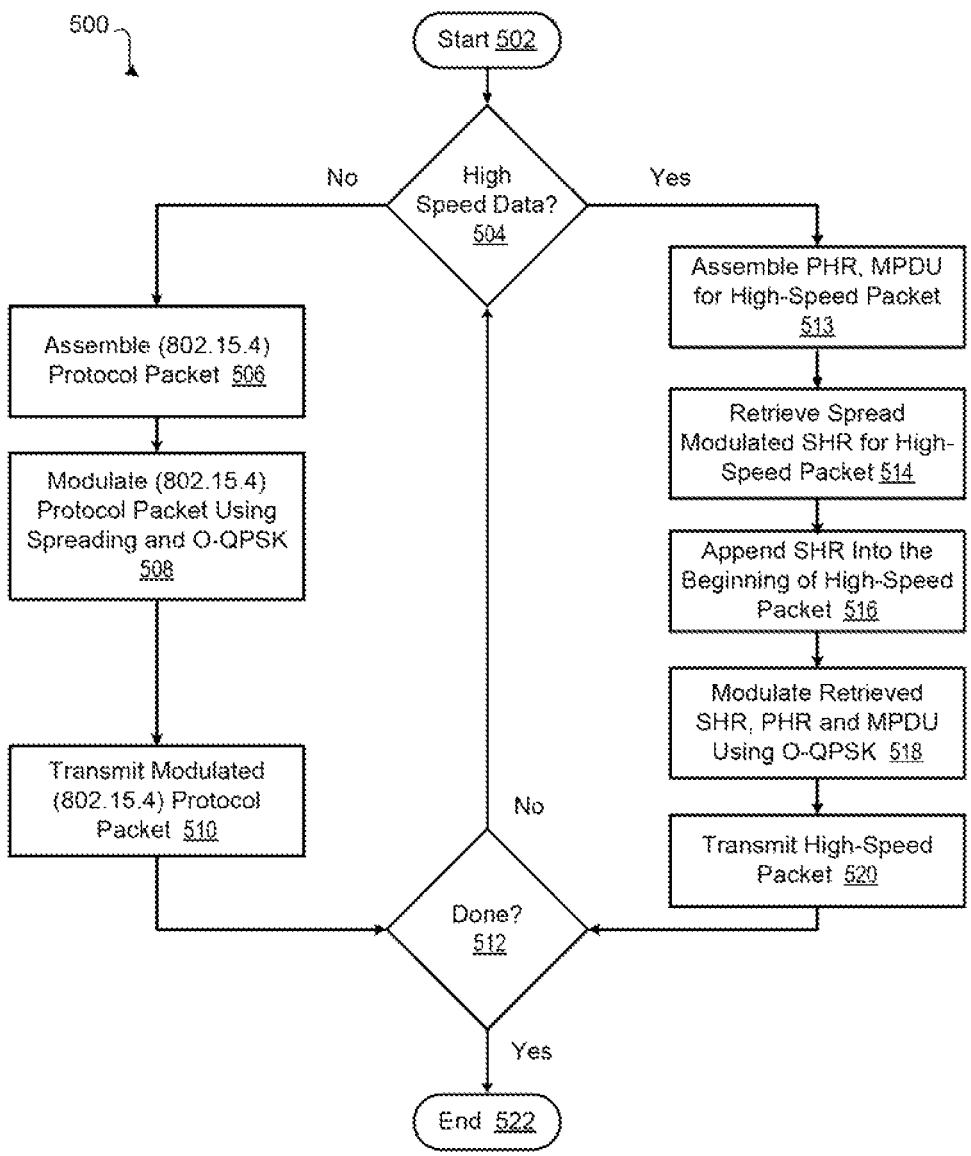
FIG. 5 depicts an example flow for performing high-rate data transfer in connection with the 802.15.4 protocol.

Selected embodiments of the present invention may also be illustrated with reference to FIG. 5, which depicts an example flow 500 for performing high-rate data transfer in connection with selected embodiments of the present invention. As depicted, the process starts (step 502) when the transmitter has data to communicate to one or more receivers. As an initial step, the transmitter determines whether the data is to be transmitted as high-speed data (decision block 504).

If the data is not to be transmitted as high-speed data (negative outcome to decision 504), the data is assembled as part of a predetermined protocol packet (step 506). In an example implementation where the 802.15.4 transmission protocol is used, the data is assembled by the MAC module into the MAC protocol data unit (MPDU) of the standard 802.15.4 data frame structure which is appended to the standard SHR and PHR header structures. However, as indicated by the parenthetical reference to (802.15.4), other transmission protocols may be used. Once assembled, the entirety of the protocol packet is modulated for transmission (step 508). In an example implementation where the 802.15.4 protocol is used, the entire 802.15.4 packet is modulated in the digital modem by applying spreading and O-QPSK modulation techniques to the entire protocol packet. The modulated protocol packet is then transmitted (step 510), such as by using the 802.15.4 transmission protocol. If the data transmission is completed (affirmative outcome to decision 512), the process ends (step 522), but otherwise (negative outcome to decision 512) the process is repeated so that any additional data can be assembled, modulated and sent.

When it is determined in the process flow 500 that the data to be transmitted is high-speed data (affirmative outcome to decision 504), the PHR and MPDU are assembled as part of a high-speed protocol packet in step 513. In an example implementation where the synchronization benefits of the 802.15.4 protocol are to be used, the high-speed protocol packet is assembled by generating or retrieving a special high-speed SHR structure (step 514). The high-speed SHR structure may include a unique SFD value that identifies the SHR structure as a high-speed header structure. In addition, the high-speed SHR structure may be stored or generated in a spread form so that, upon retrieval, it is prepared for expedited modulation and transmission. In step 516, the retrieved SHR is followed by PHR and MPDU to form a high-speed data packet. The transmitter (e.g., under MAC control) also assembles the high-speed data into a data payload structure (MPDU) and generates a frame length value (PHR) corresponding to the amount of high-speed data being transmitted. Once retrieved, the spread modulated high-speed SHR structure, PHR structure and MPDU structure are modulated for transmission (step 518). In an example implementation where the 802.15.4 protocol is used, these structures are modulated in the digital modem by applying O-QPSK modulation techniques. As a result, no spread modulation is applied to the PHR structure or the MPDU structure. The modulated high-speed SHR, PHR and MPDU structures are transmitted (step 520), such as by using the 802.15.4 transmission protocol. If the data transmission is completed (affirmative outcome to decision 512), the process ends (step 522), but otherwise (negative outcome to decision 512) the process is repeated so that any additional data can be assembled, modulated and sent.

Figure 6:
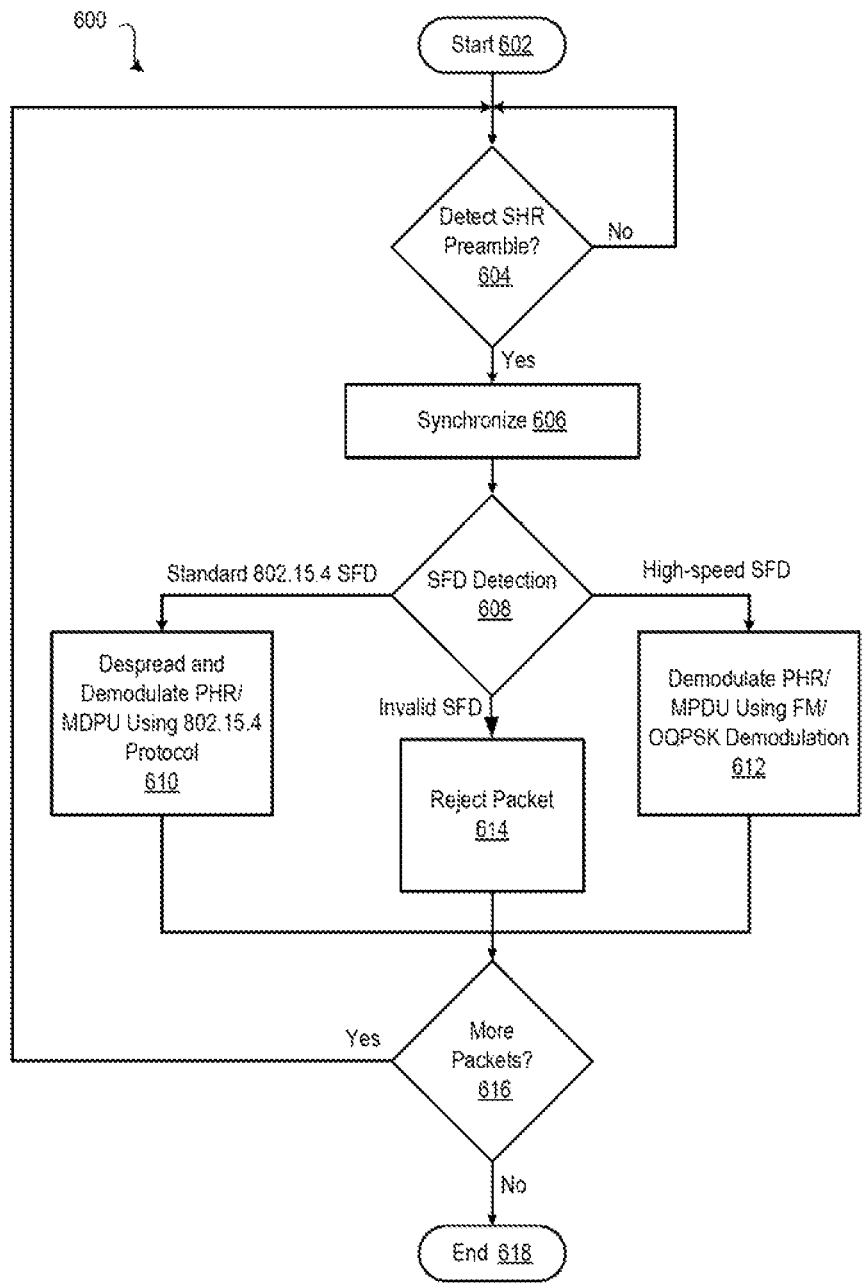
FIG. 6 depicts an example flow for receiving high-rate data packets in connection with the 802.15.4 protocol.

Selected embodiments of the present invention may also be illustrated with reference to FIG. 6, which depicts an example flow 600 for receiving high-rate data packets in connection with selected embodiments of the present invention. As depicted, the process starts (step 602) when the receiver detects the reception of a data packet that has been transmitted. When the data packet is transmitted in accordance with the 802.15.4 standard, the receiver detects the preamble sequence (affirmative outcome to detection block 604) and establishes initial time synchronization (step 606). As shown in the process flow 600, both standard 802.15.4 packets and high-speed packets use the same SHR detection platform to establish initial time and frequency synchronization. Once synchronized, the receiver detects whether the received data packet is a high-speed data packet (decision block 608). In an example implementation, high-speed data packets are detected by detecting a unique SFD value in the SHR structure to differentiate high speed data packets from standard 802.15.4 data packets. Another benefit of providing each high-speed data packet with a unique SFD identifier is that standard 802.15.4 transceivers are able to avoid false decoding of high-speed data packets.

If the data packet is detected to be a standard 802.15.4 data packet ("Standard 802.15.4 SFD" outcome to decision 608), the data packet is demodulated according to the standard 802.15.4 protocol by performing despreading on the entire data packet, thereby extracting the PHR (frame length) and MPDU (data payload) structures. However, if the data packet is a high-speed data packet in which the frame length and data payload portions were not spread modulated, ("High-speed SFD outcome to decision 608), the data packet is demodulated without performing despreading. For example, the PHR (frame length) and MPDU (data payload) structures may be extracted by performing and FM or OQPSK demodulation (step 612). If, on the other hand, the data packet is determined to be invalid because it is neither a standard 802.15.4 nor high-speed SFD, it will be rejected (step 614). If there are no more data packets (negative outcome to decision 616), the process ends (step 618), but otherwise (affirmative outcome to decision 616) the process is repeated so that any additional data packets can be demodulated to extract the data. With the disclosed packet reception flow, an efficient mechanism is provided that enables data rates many times higher than standard 802.15.4, but re-uses much of 802.15.4 protocol to maintain the low cost and low power attributes while increasing the communication throughput to 2 Mbits/sec.

By now it should be appreciated that there has been provided a method and system for transferring data in a wireless device having a short range communication link with a receiving device. In the disclosed data transfer system, a first data packet is modulated in accordance with a predetermined transmission protocol (e.g., the IEEE 802.15.4 protocol) by spreading all data bits in the first data packet, thereby transferring data at a first data rate. When data is to be transferred at a higher data rate (e.g., up to approximately of 2 Mbps), a second data packet is modulated by spreading only selected data bits (e.g., the synchronization header portion) in the second data packet and separately processing at least a data payload portion (e.g., in the MPDU portion) so that the data payload portion is not spread. In an example embodiment, the second data packet is modulated by spreading and O-QPSK modulating a synchronization header portion of the second data packet and performing only O-QPSK modulation on at least the data payload portion without spreading. In addition, the first and second data packets may each be modulated by spreading a shared preamble sequence. To address undesirable DC bias effects that can be caused by modulating the data payload portion without spreading, data whitening may be applied to the data payload portion prior to modulating the data payload portion.

In another form, there is provided a data reception method and system for receiving and demodulating a data packet in a wireless receiving device whereby a first part of the data packet is demodulated by despreading only selected data bits in the data packet, and at least a data payload portion of the data packet is separately processed (e.g., by performing OQPSK demodulation) so that the data payload portion is not despread. In selected embodiments, the first part of the data packet is demodulated by despreading a synchronization header portion of the data packet to extract a preamble sequence in accordance with the IEEE 802.15.4 protocol and a start-of-frame delimiter. Using the preamble sequence, initial synchronization may be established in accordance with the IEEE 802.15.4 protocol. With this scheme, the data packet may be received as a high-speed data frame structure that includes a synchronization header (SHR) structure, a packet header (PHR) structure and a MAC protocol data unit (MPDU structure, where a predetermined start of frame delimiter (SFD) value in the SHR structure controls how the data packet is demodulated. In contrast to the standard 802.15.4 data frame structure, the high-speed data frame structure has a larger PHR structure (e.g., two bytes in length) and a larger possible MPDU structure (e.g., up to 32,767 bytes in length).

In yet another form, there is provided a method, system and apparatus for communicating data to a destination node in a wireless personal area network (WPAN) defined at least in part according to an 802.15.4 protocol. First, a data payload is received that is to be transmitted to the destination node on the WPAN. From the data payload, an extended MAC protocol data unit (MPDU) structure is generated that includes a MAC header and MAC footer. The extended MPDU structure may be generated by performing OQPSK modulation without spreading on the extended MPDU structure. From the extended MPDU, a packet header (PHR) structure is generated. In addition, a predetermined synchronization header (SHR) structure is generated that includes at least an 802.15.4 preamble sequence. The SHR structure may be generated by performing spreading and pulse-shaping on the 801.15.4 preamble sequence and a start-of-frame delimiter (SFD) structure, and may also include generating a start-of-frame delimiter (SFD) structure having a predetermined value that is different from a standard SFD value in the 802.15.4 protocol. For example, the SFD structure may be selected to have a predetermined value (e.g., C5) which has a large hamming distance from the standard SFD value (A7) in the 802.15.4 protocol. Finally, a high-speed data frame is generated from the predetermined SHR structure, PHR structure and extended MPDU structure, and then forwarded for routing to a destination node in the WPAN. This may be done by appending the predetermined SHR structure and PHR structure as a header to the extended MPDU structure.

The methods and systems for establishing a high-speed overlay mode for providing burst data and real time data streaming in connection with 802.15.4 protocol transmission as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data into high-speed data frame structures) and/or at the receiver (e.g., recovering the transmitted signals, demodulating and decoding high-speed data frame structures from the recovered signals, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various 802.15.4 protocol-related systems and methods for using same, the present invention is not necessarily limited to the example embodiments illustrate herein. For example, various embodiments of a high-speed data modulation system and methodology disclosed herein may be implemented in connection with any proprietary or wireless communication standards where protocol controls limit that data transmission rate. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data transfer method in a wireless device having a short range communication link with a receiving device, comprising:
   modulating a first data packet in accordance with a predetermined transmission protocol by spreading all data bits in the first data packet, thereby transferring data at a first data rate during a standard transmit mode; and
   modulating a second data packet by spreading only a synchronization header portion in the second data packet and separately processing at least a data payload portion so that the data payload portion is not spread, thereby transferring data at a second higher data rate during a high-speed overlay mode.

2. The data transfer method of claim 1, where modulating the first data packet comprises modulating the first data packet in accordance with IEEE 802.15.4 protocol requirements.

3. The data transfer method of claim 1, where modulating the second data packet comprises spreading only the synchronization header portion of the second data packet so that a frame length and data payload portion of the second data packet are not spread modulated.

4. The data transfer method of claim 1, where modulating the second data packet comprises spreading only the synchronization header portion of the second data packet and performing offset quadrature phase-shift keying (O-QPSK} modulation on at least the data payload portion without spreading.

5. The data transfer method of claim 1, where the second higher data rate is approximately of 2 Mbps.

6. The data transfer method of claim 1, further comprising applying data whitening to the data payload portion prior to processing the data payload portion.

7. The data transfer method of claim 1, where modulating the first and second data packets each comprise modulating a shared preamble sequence by spreading all data bits in the shared preamble sequence.

8. A wireless communication device for transferring data over a short range communication link to a receiving device, comprising:
   a transmitter packet processor for processing outbound data to produce digital packet data in accordance with a predetermined transmission protocol; and
   a digital modem for modulating the digital packet data in accordance with the predetermined transmission protocol by spreading all data bits in the digital packet data for transferring data at a first data rate during a standard transmit mode, and for modulating the digital packet data by spreading only a synchronization header portion in the digital packet data and separately processing at least a data payload portion so that the data payload portion is not spread, thereby transferring data at a second higher data rate during a high-speed overlay mode.

9. The wireless communication device of claim 8, where the digital modem modulates the digital packet data in accordance with the IEEE 802.15.4 protocol requirements during the standard transmit mode.

10. The wireless communication device of claim 8, where the digital modem modulates the digital packet data by spreading only a synchronization header portion of the digital packet data during the high-speed overlay mode.

11. The wireless communication device of claim 8, where the digital modem modulates the digital packet data by spreading a synchronization header portion of the digital packet data and performing offset quadrature phase-shift keying (O-QPSK) modulation on at least the data payload portion without spreading during the high-speed overlay mode during which a frame length and data payload portion of the digital data packet are not spread modulated.

12. The wireless communication device of claim 8, where the second higher data rate is approximately of 2 Mbps during the high-speed overlay mode.

13. The wireless communication device of claim 8, where the transmitter packet processor applies data whitening to the data payload portion prior to processing the data payload portion.

14. The wireless communication device of claim 8, where the digital modem modulates the digital packet data by generating a predetermined synchronization header (SHR) structure in which spreading code modulation is applied to only an IEEE 802.15.4 preamble sequence during the high-speed overlay mode.

\* \* \* \* \*